(12) United States Patent
Misawa

(10) Patent No.: US 6,983,201 B2
(45) Date of Patent: Jan. 3, 2006

(54) VEHICLE HEIGHT ADJUSTMENT SYSTEM

(75) Inventor: Kenya Misawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/854,263

(22) Filed: May 27, 2004

(65) Prior Publication Data
US 2005/0010343 A1   Jan. 13, 2005

(30) Foreign Application Priority Data
Jun. 5, 2003  (JP) ............................. 2003-160340

(51) Int. Cl.
*B60G 23/00*  (2006.01)
(52) U.S. Cl. ........................ 701/37; 280/6.15; 280/5.5; 280/6.157
(58) Field of Classification Search ............. 280/6.153, 280/5.5
See application file for complete search history.

(56) References Cited

U.S. PATENT DOCUMENTS

| | | | |
|---|---|---|---|
| 4,685,689 A * | 8/1987 | Takizawa et al. ........ | 280/5.503 |
| 4,693,494 A | 9/1987 | Buma et al. | |
| 4,783,089 A * | 11/1988 | Hamilton et al. ........ | 280/6.157 |
| 4,787,644 A | 11/1988 | Yokote et al. | |
| 5,859,692 A * | 1/1999 | Ross et al. ................. | 356/4.01 |
| 6,412,789 B1 | 7/2002 | Pierce et al. | |
| 6,431,557 B1 * | 8/2002 | Terborn et al. ........... | 280/6.15 |

FOREIGN PATENT DOCUMENTS

| | | |
|---|---|---|
| EP | 0 318 013 A2 | 5/1989 |
| EP | 0 539 063 A | 4/1993 |
| JP | 10-324131 A | 12/1998 |
| WO | WO 99/50720 A | 10/1999 |

OTHER PUBLICATIONS

Patent Abstracts of Japan, vol. 0093, No. 30, Dec. 25, 1985.

* cited by examiner

*Primary Examiner*—Thomas G. Black
*Assistant Examiner*—Christine M. Behncke
(74) *Attorney, Agent, or Firm*—Sughrue Mion, PLLC

(57) ABSTRACT

In order to reduce a vehicle height adjustment time period without unnecessarily narrowing a vehicle height adjustment range, a control unit adjusts the vehicle height of a vehicle by controlling supply and discharge of air to/from air springs each disposed between a side member and an under member. When the side member is at a vehicle height lowest position, a stopper of the side member comes into contact with a stopper receiving portion of the under member. When the side member is at the vehicle height lowest position while the control unit is set to a memory mode, an adjustment range setting section of the control unit sets a vehicle height lower limit by adding a lower limit setting predetermined value to a vehicle height measured value outputted from height sensors. The control unit does not lower the side member below the vehicle height lower limit during vehicle height adjustment.

2 Claims, 3 Drawing Sheets

VEHICLE HEIGHT ADJUSTMENT SYSTEM

This application claims priority from Japanese Patent Application No. 2003-160340 filed on Jun. 5, 2003, the disclosure of which is hereby incorporated by reference herein.

BACKGROUND OF THE INVENTION

1. Field of the Invention

The present invention relates to a vehicle height adjustment system for adjusting the vehicle height of a vehicle.

2. Description of the Related Art

Many large vehicles such as a heavy-duty truck have so-called air suspensions, which use air springs as vehicle chassis springs.

Trucks or other large vehicles can secure a given suspension stroke irrespective of the weight of loaded cargos, by keeping the height of a body frame (vehicle height) at a predetermined height from an axle. Accordingly, it is possible to improve the ride comfort and also to reduce the vibration of a cargo bed effectively. The "predetermined height" is called a reference vehicle height and the value thereof is suitably determined depending on the vehicle model.

Trucks or other large vehicles having an air suspension, in particular, often include a vehicle height adjustment system which is capable of adjusting the vehicle height by supplying and discharging air to/from air springs. Specifically, this vehicle height adjustment system first determines a current vehicle height, for example, by detecting a distance between an axle and a body frame, and the like, and then compares the current vehicle height with a predetermined reference vehicle height. When the current vehicle height is different from the predetermined reference vehicle height, the vehicle height adjustment system performs such adjustment as to maintain a constant vehicle height by supplying air to air springs of the air suspension from an air tank or air bellows or by discharging air from the air springs to the atmosphere (for example, see the Patent Document 1).

(Patent Document 1) Japanese Patent Laid-Open No. H10 (1998)-324131

However, if no limit is imposed on a vehicle height adjustment range, unnecessary supply and discharge of air are performed. Therefore, an upper limit and a lower limit are normally given for the vehicle adjustment. As a method of setting these limits, the vehicle height is adjusted, while being visually monitored, by supplying or discharging air to/from air springs, and then, when there is no change in a value of the vehicle height for a given period of time, this value of the vehicle height is set as an upper limit or lower limit.

Generally, a stopper and a stopper receiving portion are provided on a body frame side and an under member side to which an air spring is fixed, respectively. When air is discharged from the air spring and the body frame is lowered, the relative distance between the stopper and the stopper receiving portion is gradually reduced. The stopper comes into contact with the stopper receiving portion before the air in the air spring is completely bled off, and thus the body frame is prevented from being further lowered. With such a structure, the load of the lowered body frame side is borne by an axle housing, with the stopper and stopper receiving portion mainly made from an elastic member and interposed between the body frame and the axle housing. In this way, the body frame does not come into direct contact with the axle housing when the air in the air spring is discharged and the bearing power by means of air-pressure is significantly reduced. When the air is gradually discharged, the stopper first comes into contact with the stopper receiving portion. Thereafter, the vehicle height is gradually lowered while the stopper or stopper receiving portion is compressed, and at a certain level, the vehicle height is not lowered any further. Thus, the vehicle height at this level is made to be the lower limit. In such a case, if the vehicle height is intended to be lowered to the lower limit, the discharge of air from the air spring is continued even after the stopper has come into contact with the stopper receiving portion, up until the stopper or stopper receiving portion is compressed and the vehicle height reaches the lower limit, performing excessive air discharge. Accordingly, when the supply of air to the air spring is started in order to raise the vehicle height again, the vehicle height is not raised immediately, consuming time to separate the stopper from the stopper receiving portion. That is, the vehicle height adjustment time is increased, and the amount of air consumption becomes large as well.

Such disadvantages are avoidable by stopping the air discharge before the body frame reaches the vehicle height lowest position. However, it is difficult to uniformly set vehicle heights where the air discharge is stopped, because of assembly errors of a height sensor, air spring, stopper, stopper receiving portion, and the like. If the vehicle heights where the air discharge is stopped are uniformly set high in order to avoid the influence of the assembly errors, the vehicle height adjustment range is unnecessarily narrowed. In addition, the above-described method of setting the upper and lower limits also has a problem that the upper and lower limits need to be set individually.

SUMMARY OF THE INVENTION

The present invention was accomplished in the light of the above-described circumstances. An object of the present invention is to provide a vehicle height adjustment system capable of reducing the vehicle height adjustment time without unnecessarily narrowing the vehicle height adjustment range.

In order to achieve the above object, there is provided a vehicle height adjustment system for adjusting a vehicle height of a vehicle by -controlling supply and discharge of air to/from an air spring, the vehicle having a body frame, an under member being disposed below the body frame and supporting an axle, and the air spring disposed between the body frame and the under member. The vehicle height adjustment system comprises a height sensor, a pair of a stopper and a stopper receiving portion at least one of which has an elastically deformable portion, mode setting means, vehicle height lower limit setting means, and air controlling means.

The stopper and the stopper receiving portion are respectively fixed to one of the body frame and the under member and to the other thereof, and prevent the body frame from coming into direct contact with an axle housing when the vehicle height is lowered. In the mode setting means, an adjustment range setting mode for setting a vehicle height adjustment range and a vehicle height adjusting mode for adjusting a vehicle height are selectively set. When the body frame is at the vehicle height lowest position while the mode setting means is set to the adjustment range setting mode, the vehicle height lower limit setting means sets a vehicle height lower limit by adding a lower limit setting predetermined value to a vehicle height measured value outputted from the height sensor. When the vehicle height measured value outputted from the height sensor becomes equal to or smaller than the vehicle height lower limit while the mode setting means is set to the vehicle height adjusting mode, the air controlling means stops the discharge of air from the air spring.

In this structure, in the case of discharging air from the air spring in order to lower the vehicle height to the lowest level during the vehicle height adjusting mode, the air controlling means stops the discharge of air from the air spring when the body frame reaches the vehicle height lower limit before reaching the vehicle height lowest position. Thus, the lowering of the body frame is finished before excessive air discharge is performed. In this state, the body frame is supported by the air spring, and therefore, when the supply of air to the air spring is started to raise the vehicle height again, the body frame immediately starts moving up. Accordingly, it is possible to reduce the vehicle height adjustment time.

Moreover, since the setting of the vehicle height lower limit is individually performed for each vehicle, the vehicle height adjustment range is not unnecessarily narrowed.

At least one of the stopper and the stopper receiving portion has the elastically deformable portion which is elastically deformed when the body frame is at the vehicle height lowest position. The lower limit setting predetermined value has a quantity equal to or larger than the deformed quantity of the elastically deformable portion of when the body frame is at the vehicle height lowest position.

The deformed quantity of the elastically deformable portion is the largest when the body frame is at the vehicle height lowest position, and is gradually reduced as the body frame is raised from the vehicle height lowest position. When the stopper is separated from the stopper receiving portion, the deformed quantity becomes zero. While the elastically deformable portion is being deformed as described above, the raised/lowered quantity of the body frame is small relatively to the supplied/discharged amount of air to/from the air spring. Therefore, the vehicle height adjustment time is long also in this range.

In contrast, in the aforementioned structure, the lower limit setting predetermined value has a quantity equal to or larger than the deformed quantity of the elastically deformable portion of when the body frame is at the vehicle height lowest position. Therefore, while the body frame is at a level corresponding to the vehicle height lower limit, the stopper and the stopper receiving portion are not in contact with each other. Accordingly, it is possible to reduce the vehicle height adjustment time without being affected by the elastically deformable portion.

Moreover, the vehicle height adjustment system may further comprise vehicle height upper limit setting means for setting a vehicle height upper limit by adding an upper limit setting predetermined value to the vehicle height lower limit. In this case, when the vehicle height measured value outputted from the height sensor becomes equal to or larger than the vehicle height upper limit while the mode setting means is set to the vehicle height adjusting mode, the air controlling means stops the supply of air to the air spring.

In the above-described structure, in the case of supplying air to the air spring to raise the vehicle height to the highest level, the air controlling means stops the supply of air to the air spring when the body frame reaches the vehicle height upper limit, and thus the raising of the body frame is finished. That is, it is possible to surely prevent such excessive air supply as to bring the air spring into a state of being extended to its full length or more.

BRIEF DESCRIPTION OF THE DRAWINGS

The above and other features will be better understood from the exemplary embodiment described below, taken together with the drawings, of which

DETAILED DESCRIPTION OF THE PREFERRED EMBODIMENT

A preferred embodiment according to the present invention will be described below with reference to the accompanying drawings.

Figure 1:
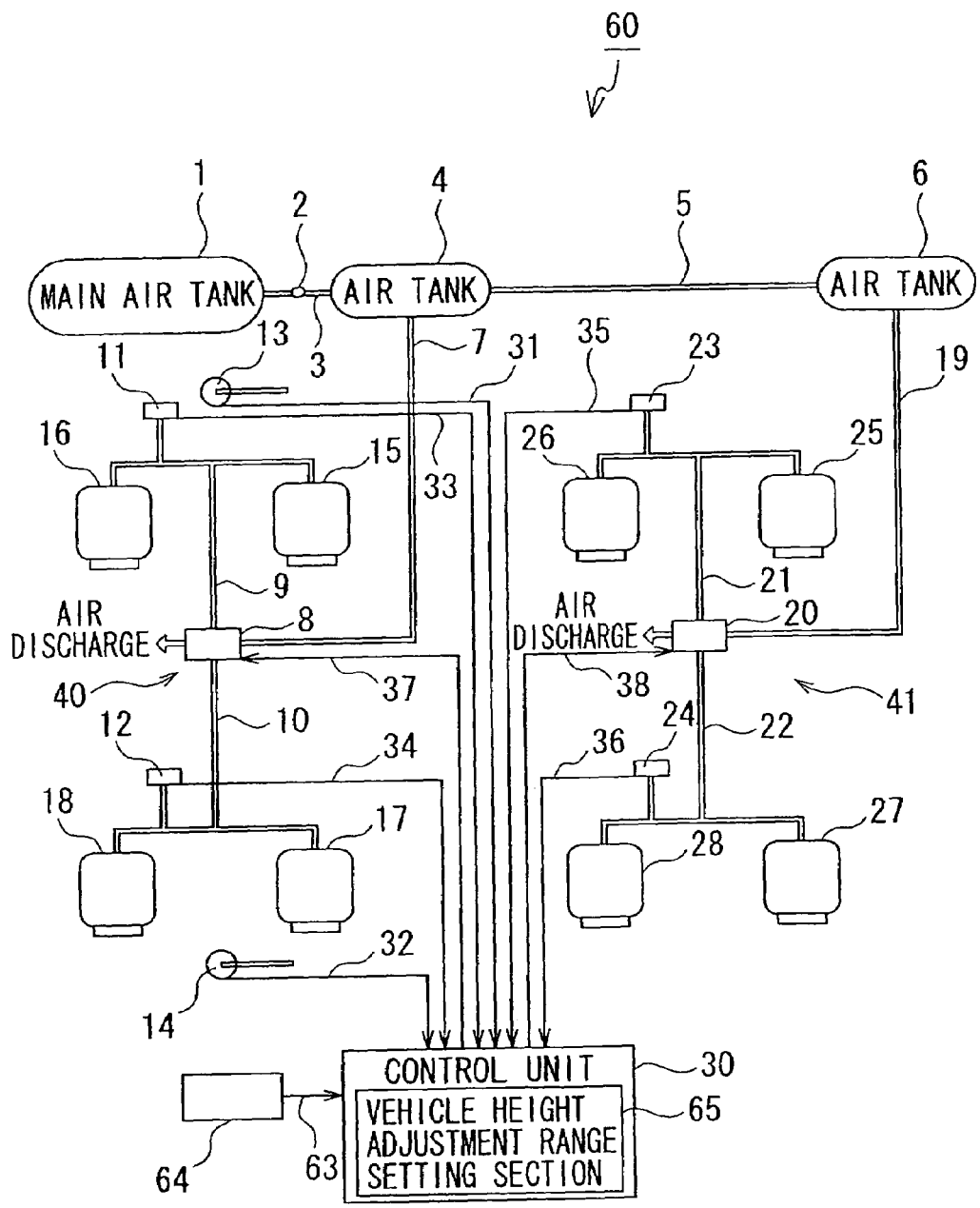
FIG. 1 is a general view schematically showing an air system of a vehicle having a vehicle height adjustment system according to an embodiment of the present invention.
Figure 2:
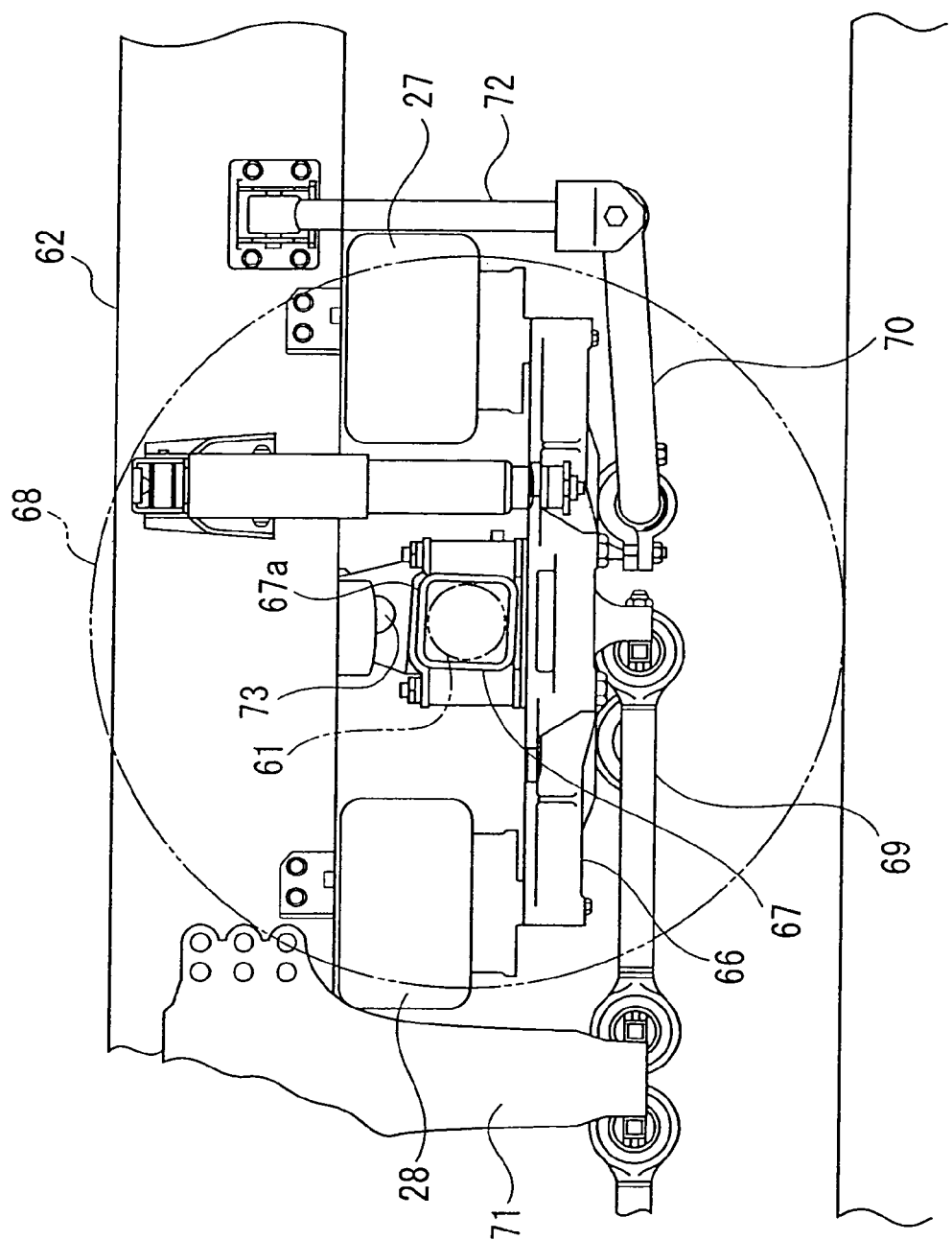
FIG. 2 is a side view showing a schematic structure around a rear-rear axle.

FIG. 1 is a general view schematically showing an air system on a rear axle side of a vehicle having a vehicle height adjustment system according to an embodiment of the present invention. FIG. 2 is a side view showing a schematic structure around a rear-rear axle. Note that, in this embodiment, only diagrams of the rear axle side are shown and those of a front axle side are omitted.

First, a description will be given of a basic structure of this air system with reference to FIG. 1.

As shown in FIG. 1, a vehicle 60 according to this embodiment includes, on its rear axle side, a forward-rear axle (not shown) and a rear-rear axle (denoted by reference numeral 61 in FIG. 2). The forward-rear axle is supported by a side member (denoted by reference numeral 62 in FIG. 2) as a body frame, with four air springs 15 to 18 interposed therebetween. The rear-rear axle 61 is supported by the side member 62 with another four springs 25 to 28 interposed therebetween. Incidentally, the air springs 15 and 16 on a forward-rear axle side 40 are air springs for a front wheel of two right back wheels; the air springs 17 and 18 for a front wheel of two left back wheels; the air springs 25 and 26 on a rear-rear axle side 41 for a rear wheel of the two right back wheels; and the air springs 27 and 28 for a rear wheel of the two left back wheels.

An air supply side of the air system includes a compressor (not shown); a main air tank 1 in which the air from the compressor is stored; a first air tank 4 for the air springs 15 to 18 on the forward-rear axle side 40; and a second air tank 6 for the air springs 25 to 28 on the rear-rear axle side 41. The first air tank 4 on the forward-rear axle side 40 is communicatively connected with the main air tank 1 through an air passage 3. The second air tank 6 on the rear-rear axle side 41 is communicatively connected with the main air tank 1 through the air passage 3, the first air tank 4 and an air passage 5. These first and second air tanks 4 and 6 on the forward and rear-rear axle sides 40 and 41, respectively, each store air to be supplied to an undermentioned air consumption side in a high-pressure state. Note that a safety valve 2 for preventing the internal pressure of the main air tank 1 from reducing to a predetermined value or under is provided in the air passage 3. In other words, when the internal pressure of the main air tank 1 is reduced to the predetermined value or under for some reason while the vehicle is running or the like, the safety valve 2 stops supplying air from the main air tank 1 to the first and second air tanks 4 and 6. Thus, the pressure of the air to be supplied from the main air tank 1 to a low-pressure air system and the like including a brake system (not shown) is maintained, and the safety of the vehicle 60 can be ensured.

The air consumption side of the air system includes a magnetic valve 8 and the air springs 15 to 18 on the forward-rear axle side 40; and a magnetic valve 20 and the air springs 25 to 28 on the rear-rear axle side 41. The magnetic valve 8 on the forward-rear axle side 40 is communicatively connected with the first air tank 4 through an air passage 7. The magnetic valve 20 on the rear-rear axle side 41 is communicatively connected with the second air tank 6 through an air passage 19. Moreover, the magnetic valve 8 on the forward-rear axle side 40 is communicatively connected with the air springs 15 and 16 through an air passage 9, and with the air springs 17 and 18 through an air passage 10. The magnetic valve 20 on the rear-rear axle side 41 is communicatively connected with the air springs 25 and 26 through an air passage 21, and with the air springs 27 and 28 through an air passage 22. The magnetic valve 8 on the forward-rear axle side 40 is connected to a control unit 30 through a signal line 37. Open/close control signals sent from this control unit 30 control the air supply/discharge operation whether to supply air from the first air tank 4 to the air springs 15 to 18 or to discharge air from the air springs 15 to 18. Moreover, the magnetic valve 20 on the rear-rear axle side 41 is connected to the control unit 30 through a signal line 38, and control signals sent from this control unit 30 controls the air supply/discharge operation whether to supply air from the second air tank 6 to the air springs 25 to 28 or to discharge air from the air springs 25 to 28.

A pressure sensor 11 is provided in the air passage 9 on the forward-rear axle side 40, for detecting the internal pressure of the air passage 9, that is, the internal pressure of the air springs 15 and 16. Similarly, a pressure sensor 12 for detecting the internal pressure of the air springs 17 and 18 is provided in the air passage 10. Moreover, a pressure sensor 23 for detecting the internal pressure of the air springs 25 and 26 is provided in the air passage 21 on the rear-rear axle side 41. Similarly, a pressure sensor 24 for detecting the internal pressure of the air springs 27 and 28 is provided in the air passage 22. The pressure sensor 11 is connected to the control unit 30 through a signal line 33, and similarly, the pressure sensors 12, 23 and 24 are each connected to the control unit 30 through signal lines 34, 35 and 36, respectively. Values of the internal pressures detected by the respective pressure sensors 11, 12, 23, and 24 are sent to the control unit 30 through the respective signal lines 33, 34, 35 and 36.

In addition, height sensors (vehicle height sensors) 13 and 14 are provided in the vehicle height adjustment system of the present invention, for detecting the height position of the rear axle relative to the side member 62, that is, the vehicle height of the rear axle side. Incidentally, the height sensor 13 detects the vehicle height of the right rear axle side, and the height sensor 14 detects the vehicle height of the left rear axle side. The height sensor 13 is connected to the control unit 30 through a signal line 31, and the height sensor 14 is connected to the control unit 30 through a signal line 32. Vehicle height measured values detected by these height sensors 13 and 14 are sent to the control unit 30 through the respective signal lines 31 and 32.

The control unit 30 functions as air controlling means and controls the magnetic valves 8 and 20 so as to supply air to the air springs 15 to 18 and 25 to 28 from the first and second air tanks 4 and 6, respectively, and to discharge air from the air springs 15 to 18 and 25 to 28 to the atmosphere. Thus, the vehicle height is adjusted (changed).

Further, the control unit 30 also functions as mode setting means. A plurality of modes are stored in the control unit 30 in advance, including an automatic mode and a manual mode (both are vehicle height adjusting modes) for adjusting the vehicle height, a memory mode (adjustment range setting mode) for setting upper and lower limits to be described later, and the like. Among these, one mode is set by an input from a driver or others. An input device 64 is connected to the control unit 30 through a signal line 63. A driver or others operate the input device 64, thereby performing input to set a mode of the control unit 30 and input to set a vehicle height during the manual mode to be described later, as well as predetermined input during the memory mode, and the like.

The control unit 30 is automatically set to the automatic mode while the vehicle is running and controls the supply and discharge of air to/from the air springs 15 to 18 and 25 to 28 so that a current vehicle height measured value outputted from the height sensors 13 and 14 becomes equal to the value of a reference vehicle height.

When the mode is changed from the automatic mode to the manual mode while the vehicle is stationary, the control unit 30 controls the supply and discharge of air to/from the air springs 15 to 18 and 25 to 28 so that a current vehicle height measured value outputted from the height sensors 13 and 14 becomes equal to the value of a required set vehicle height inputted from the input device 64.

Furthermore, the control unit 30 includes a vehicle height adjustment range setting section 65 which has functions as vehicle height upper limit setting means and vehicle height lower limit setting means. The operation of this vehicle height adjustment range setting section 65 will be described later.

Next, a description will be given of the layout and structure of the air springs 15 to 18 and 25 to 28, taking the air springs 27 and 28 on the left of the rear-rear axle 61 shown in FIG. 2 as an example. Note that since the basic layouts and structures of the other air springs 15 to 18, 25 and 26 are the same as those of the air springs 27 and 28, description thereof will be omitted.

As shown in FIG. 2, an under member 66 is disposed below the side member 62, and a housing 67 is fixed to an upper face around the center of the under member 66 in the longitudinal direction of the vehicle body. The housing 67 rotatably supports the rear-rear axle 61 which rotates together with rear rear-wheels (tires) 68.

To a lower portion of the under member 66, individually connected are a rear end of a torque rod 69 extending toward the front of the vehicle body, and a front end of a stabilizer 70 extending toward the rear of the vehicle body. A front end of the torque rod 69 is connected to a supporting member 71 downwardly extending from the side member 62. A rear end of the stabilizer 70 is connected to a rod 72 downwardly extending from the side member 62.

The air spring 27 is disposed between a lower face of the side member 62 and an upper face of a rear portion of the under member 66 in the longitudinal direction of the vehicle body. The air spring 28 is disposed between the lower face of the side member 62 and an upper face of a front portion of the under member 66 in the longitudinal direction of the vehicle body. Upper portions of the air springs 27 and 28 are each connected to the side member 62, and lower portions of the air springs 27 and 28 are each connected to the under member 66.

When air is supplied into the air springs 27 and 28, the distance between the side member 62 and the under member 66 is increased, and thus the vehicle height is raised. Reversely, when air is discharged from the air springs 27 and 28, the distance between the side member 62 and the under member 66 is reduced, and thus the vehicle height is lowered.

A stopper (elastically deformable portion) 73, made of an elastic material such as rubber, is fixed to the lower face of the side member 62 and disposed so as to face an upper face (stopper receiving portion) 67a of the housing 67. When air is discharged from the air springs 27 and 28 in a state of being sufficiently supplied with air, and the side member 62 is lowered to reach a predetermined height (the distance between the side member 62 and the under member 66 becomes equal to or smaller than a predetermined distance), the stopper 73 comes into contact with the upper face 67a of the housing 67. In this state, when the air is further discharged, the stopper 73 is elastically deformed, and the side member 62 reaches the vehicle height lowest position to stop moving and is not lowered any further.

Next, a description will be given of the vehicle height adjustment range setting section 65 with reference to FIGS. 1 and 2.

When the control unit 30 is set to the memory mode, the control unit 30 first allows the air springs 15 to 18 and 25 to 28 to discharge air sufficiently. Thus, the side member 62 reaches the vehicle height lowest position to stop moving. A memory (not shown) of the control unit 30 stores a vehicle height measured value a1 outputted from the height sensors 13 and 14. The vehicle height adjustment range setting section 65 calculates a vehicle height lower limit HL by adding a lower limit setting predetermined value a to the stored vehicle height measured value a1, and also calculates a vehicle height upper limit HU by adding an upper limit setting predetermined value $\beta$ to the vehicle height lower limit HL. These vehicle height lower and upper limits HL and HU are stored in the memory. Here, the lower limit setting predetermined value a is set to a value that is equal to or slightly larger than a value equivalent to the elastically deformed quantity of the stopper 73 of when the side member 62 is at the vehicle height lowest position. Meanwhile, the upper limit setting predetermined value $\beta$ is set to such a maximum value as not to bring the air springs 15 to 18 and 25 to 28 into a state of being extended to their full length, in consideration for a suspension stroke.

In the automatic or manual mode, the control unit 30 controls the supply and discharge of air to/from the air springs 15 to 18 and 25 to 28 so that a current vehicle height measured value outputted from the height sensors 13 and 14 becomes equal to the value of the reference vehicle height or the value of the required set vehicle height. In this adjustment of the vehicle height, the control unit 30 stops the discharge of air from the air springs 15 to 18 and 25 to 28 when the vehicle height measured value outputted from the height sensors 13 and 14 becomes equal to or smaller than the vehicle height lower limit HL, and stops the supply of air to the air springs 15 to 18 and 25 to 28 when the vehicle height measured value becomes equal to or larger than the vehicle height upper limit HU.

Figure 3:
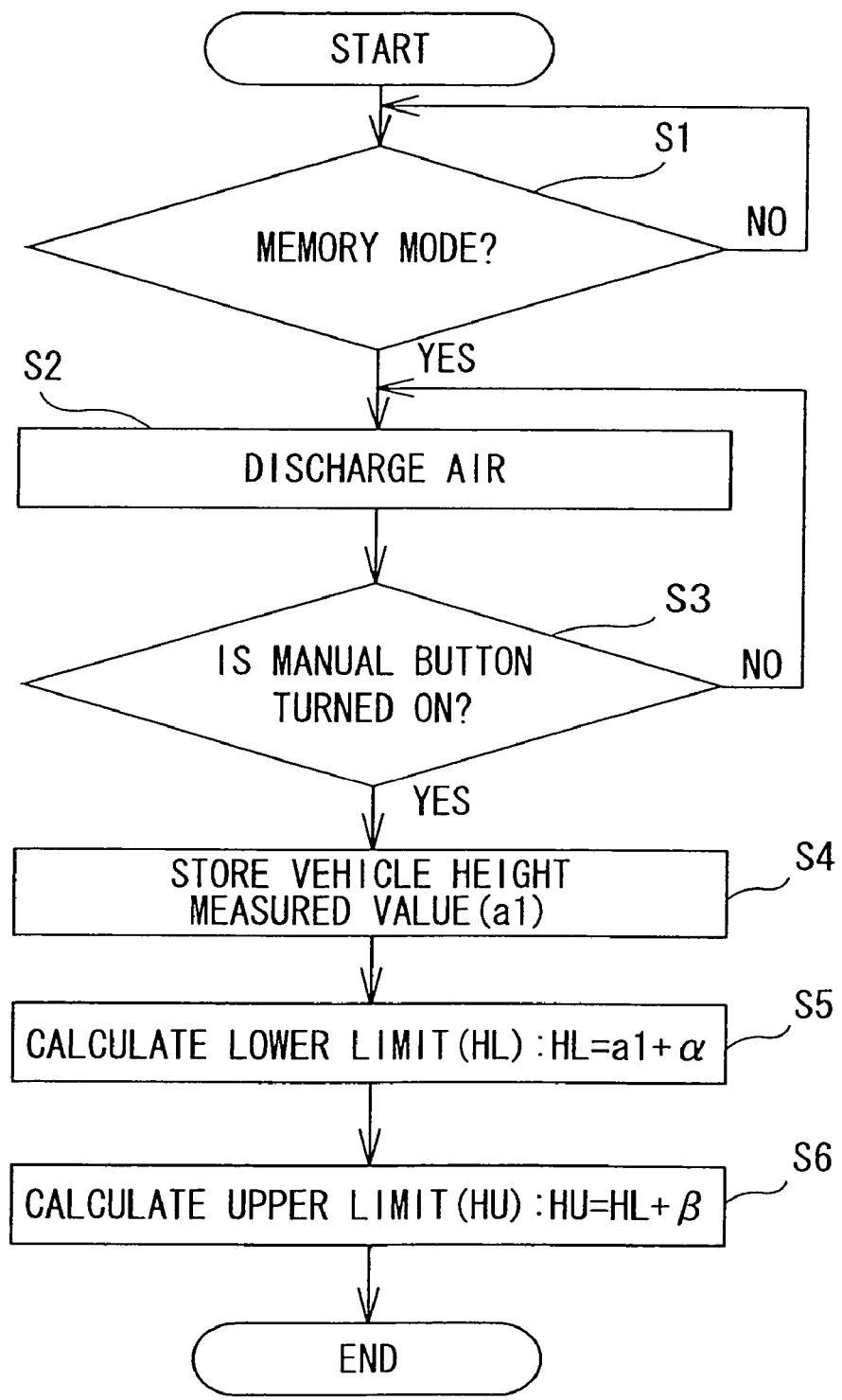
FIG. 3 is a flowchart according to the embodiment.

Next, a description will be given of the control in the memory mode to be executed by the control unit 30 with reference to a flowchart of FIG. 3.

This control is started by turning on an ignition switch (not shown) and first proceeds to Step S1.

In Step S1, it is determined whether the mode has been set to the memory mode. When the input device 64 is operated and the mode is set to the memory mode, the control proceeds to Step S2.

In Step S2, the control causes the discharge of air from the air springs 15 to 18 and 25 to 28, thus lowering the vehicle height. At this time, the lowering of the vehicle height may be performed by manual operation.

In Step S3, it is determined whether a vehicle height adjustment range has been set or has been required to change (whether a manual button has been turned on) by a driver or others operating the input device 64. When the manual button is turned on, the control proceeds to Step S4. When the manual button is not turned on, the control returns to Step S2.

In addition, in Step S3, it may be determined whether the vehicle height measured value outputted from the height sensors 13 and 14 has not changed for a given period of time, instead of determining whether the manual button has been turned on as described above. That is, when there has been no change in the vehicle height measured value for a given period of time, it may be determined that the side member 62 has reached the vehicle height lowest position, and the control may proceed to Step S4. When the vehicle height measured value is still changing, it is determined that the side member 62 has not reached the vehicle height lowest position yet, and therefore the control returns to Step S2.

In Step S4, the vehicle height measured value a1 at this time (in a state where the side member 62 has reached the vehicle height lowest position) is stored in the memory.

In Step S5, the vehicle height lower limit HL is calculated according to the following equation (1) and stored in the memory. Note that the value $\alpha$ is set based on the elastically deformed quantity of the stopper or stopper receiving portion and set so that the vehicle height lower limit does not bring the stopper into contact with the stopper receiving portion and so that the distance therebetween is not too large.

$$HL = a1 + \alpha \qquad (1)$$

In Step S6, the vehicle height upper limit HU is calculated according to the following equation (2) and stored in the memory, and then this control is finished. Note that the value $\beta$ is set so that a sufficient suspension stroke can be obtained.

$$HU = HL + \beta \qquad (2)$$

Once the vehicle height lower and upper limits HL and HU are set in accordance with the above-described control, vehicle height adjustment is performed within a range between the vehicle height lower limit HL and the vehicle height upper limit HU in the automatic and manual modes.

As described above, in the automatic and manual modes, the available up/down range for the side member 62 is limited from the vehicle height lower limit HL, which is higher in level than the vehicle height lowest position, up to the vehicle height upper limit HU.

Therefore, the lowering of the side member 62 is stopped before the side member 62 is lowered below the vehicle height lowest position to cause excessive air discharge. Moreover, the side member 62 set at a level corresponding to the vehicle height lower limit HL is supported by the air springs 15 to 18 and 25 to 28. Therefore, when the supply of air to the air springs 15 to 18 and 25 to 28 is started to increase the vehicle height again, the side member 62 immediately starts moving up. Accordingly, it is possible to reduce the vehicle height adjustment time.

Moreover, the side member 62 is not raised above a level corresponding to the vehicle height upper limit HU. Accordingly, while securing a sufficient suspension stroke, it is possible to surely prevent such excessive air supply as to bring the air springs 15 to 18 and 25 to 28 into a state of being extended to their full lengths or more.

Furthermore, the deformed quantity of the stopper 73 is the largest when the side member 62 is at the vehicle height lowest position, and is gradually reduced as the side member 62 is raised from the vehicle height lowest position. When the stopper 73 is separated from the upper face 67a of the housing 67, the deformed quantity becomes zero. While the stopper 73 is being deformed as described above, the raised/lowered quantity of the side member 62 is small relatively to the supplied/discharged amount of air to/from the air springs 15 to 18 and 25 to 28. Therefore, the vehicle height adjustment time is also long in this range.

In this embodiment, however, the lower limit setting predetermined value α has a quantity equal to or larger than the deformed quantity of the stopper 73 of when the side member 62 is at the vehicle height lowest position. Therefore, while the side member 62 is at the vehicle height lowest position, the stopper 73 and the upper face 67a of the housing 67 are not in contact with each other. Accordingly, it is possible to reduce the vehicle height adjustment time without being affected by the elastic deformation of the stopper 73.

In addition, the setting of the vehicle height lower and upper limits HL and HU is individually performed for each vehicle. Accordingly, the vehicle height adjustment range is not unnecessarily narrowed.

It should be noted that the embodiment described above is one example of the present invention. It is needless to say that the present invention is therefore not limited to the embodiment described above, and various alternations can be made depending on the design and the like without departing from the technical idea according to the present invention. For example, although the entire stopper 73 is formed of an elastic member in this embodiment, part of the stopper may be formed of an elastic member, or an elastic member to abut on the stopper may be fixed to the upper face 67a of the housing 67. Moreover, setting may be made such that when the ignition switch is turned on first after a battery (not shown) is connected, the memory mode is automatically set and the vehicle height adjustment range is set (Steps S4 to S6 in FIG. 3 are executed). Furthermore, for example, it is possible to provide the vehicle height adjustment system of the present invention not only on the rear axle side but also on the front axle side. Further, it is also possible to set the vehicle height lower and upper limits for each of the right and left sides of the axle.

As described above, according to the present invention, it is possible to reduce the vehicle height adjustment time without unnecessarily narrowing the vehicle height adjustment range.

What is claimed is:

1. A vehicle height adjustment system for adjusting a vehicle height of a vehicle by controlling supply and discharge of air to/from an air spring, the vehicle having a body frame, and under member being disposed below the body frame and supporting an axle, and the air spring disposed between the body frame and the under member, the vehicle height adjustment system comprising:
a height sensor;
a pair of a stopper and a stopper receiving portion at least one of which has an elastically deformable portion and both of which are respectively fixed to one of the body frame and the under member and to the other thereof, the pair coming into contact with each other at a vehicle height lowest position where the body frame comes at a lowest level, and the pair thus preventing the body frame from being lowered below the vehicle height lowest position,
mode setting means for selectively setting an adjustment range setting mode for setting a vehicle height adjustment range and a vehicle height adjusting mode for adjusting the vehicle height,
vehicle height lower limit setting means for setting a vehicle height lower limit by adding a lower limit setting predetermined value to a vehicle height measured value when the vehicle frame is at the vehicle height lowest position while the mode setting means is set to the adjustment range setting mode, the vehicle height setting predetermined value having a quantity equal to or larger than a deformed quantity of the elastically deformable portion of when the body frame is at the vehicle height lowest position, and the vehicle height measured value being outputted from the height sensor; and
air controlling means for stopping discharge of air from the air spring when the vehicle height measured value outputted from the height sensor becomes equal to or smaller than the vehicle height lower limit while the mode setting means is set to the vehicle height adjusting mode.

2. The vehicle adjustment system according to claim 1, further comprising:
vehicle height upper limit setting means for setting a vehicle height upper limit by adding an upper limit setting predetermined value to vehicle height lower limit, wherein
the air controlling means stops supply of air to the air sprig when the vehicle height measured value outputted from the height sensor becomes equal to or larger than the vehicle height upper limit while the mode setting means is set to the vehicle height adjusting mode.

* * * * *